Patented Jan. 26, 1943

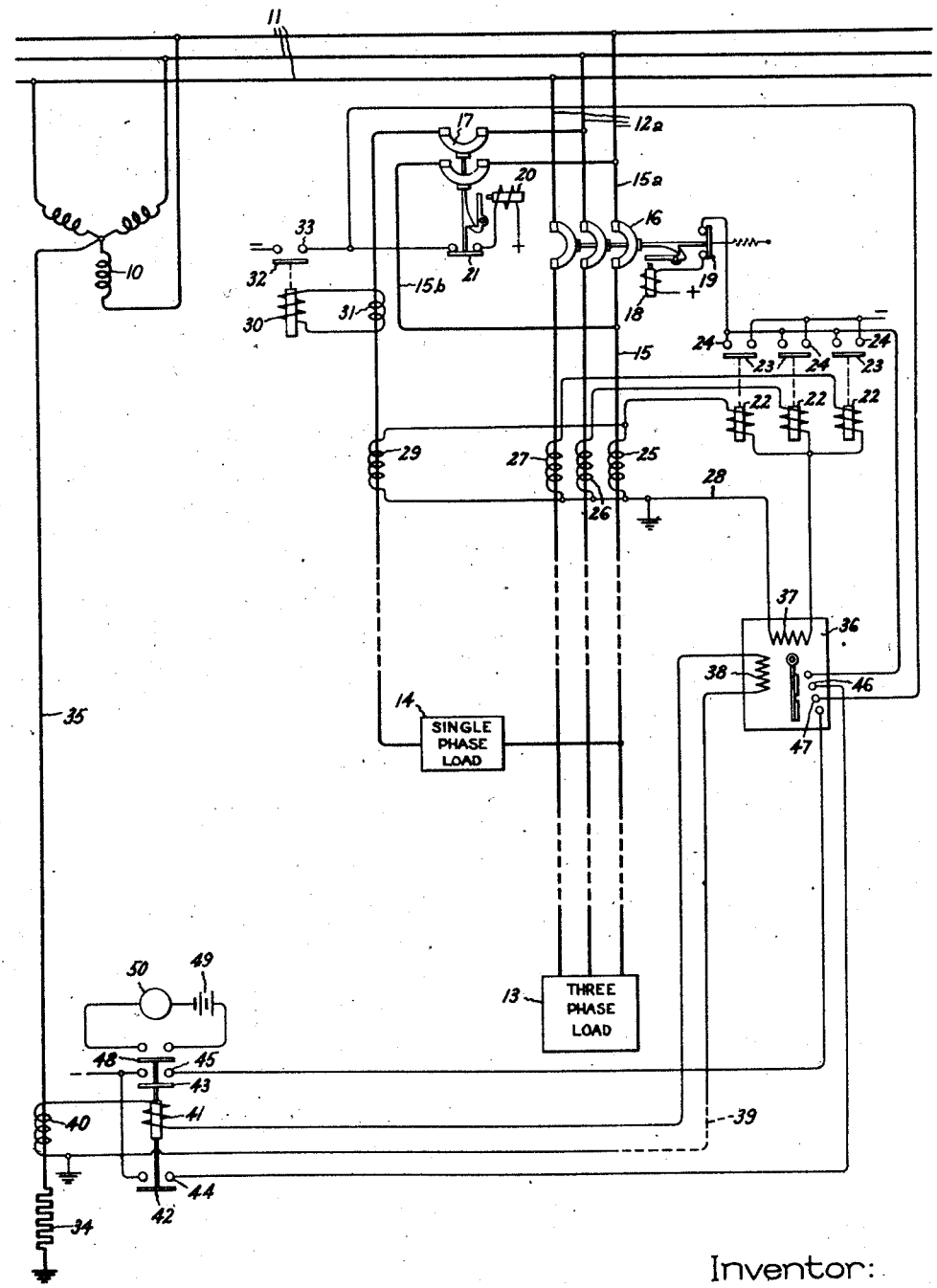

2,309,433

UNITED STATES PATENT OFFICE 2,309,433

PROTECTIVE SYSTEM

Arvid E. Anderson, Media, Pa., assignor to General Electric Company, a corporation of New York Application April 19, 1941, Serial No. 389,371

8 Claims. (Cl. 175—294)

My invention relates to protective systems for electric circuits and more particularly to a protective system for a polyphase alternating-current circuit.

Where a polyphase alternating-current supply circuit normally supplies an unbalanced load, such as a combined balanced polyphase load and a single-phase load, considerable difficulty has been encountered in providing adequate ground-fault protection. The common forms of ground-fault protection dependent upon an unbalanced condition on the system cannot be used in this situation because the system is supplying a normally unbalanced polyphase load and means must be provided to distinguish the normally unbalanced condition from an abnormally unbalanced condition occurring upon the existence of a ground fault.

It is an object of my invention, therefore, to provide a protective system for a polyphase system supplying a normally unbalanced load which is responsive to an abnormal unbalance caused by a ground fault on the system.

It is another object of my invention to provide a protective system for a plurality of interconnected circuits, one of which has fewer conductors than the other.

It is a further object of my invention to provide a new and improved differential fault-responsive protective means for a plurality of interconnected circuits.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing illustrating diagrammatically one embodiment of my invention.

Referring now to the drawing, I have illustrated a polyphase source of electrical energy shown schematically as a three-phase Y-connected generator 10 supplying electrical energy to a three-phase power line or bus 11 from which a plurality of normally unbalanced polyphase load circuits 12a, etc., are fed. For the sake of simplifying the drawing, only one of such load circuits 12a has been illustrated but it will be understood by those skilled in the art that a plurality of such circuits will normally be supplied from power line 11. These normally unbalanced polyphase load circuits may comprise various arrangements of interconnected circuits.

In the drawing, I have illustrated normally unbalanced polyphase load circuit 12a as comprising a balanced three-phase load schematically indicated at 13 and a single-phase load schematically indicated at 14 together providing a normally unbalanced polyphase load. The single-phase load circuit including single-phase load 14 has one of its supply conductors, namely 15, in common with the supply conductors of the three-phase load indicated at 13 as will be described in more detail hereinafter.

Since it might be desirable to supply either the three-phase load 13 or the single-phase load 14 above, I provide a separate circuit-interrupting means 16 for controlling the three-phase load and a separate circuit-interrupting means 17 for controlling the single-phase load. It will be understood that, with this arrangement, when both the three-phase load 13 and the single-phase load 14 are supplied simultaneously from power line 11, it is possible to continue supplying one of these loads even though a predetermined fault condition occurred on the other of these loads and caused operation of its associated circuit-interrupting means. Circuit-interrupting means 16 is illustrated as a latched closed circuit breaker having a trip coil 18 and an "a" switch 19 which is closed when the circuit breaker is closed and open when the circuit breaker is open. Also, circuit-interrupting means 17 is illustrated as having a trip coil 20 and an "a" switch 21. In order that individual control of the interconnected load circuits 13 and 14 may be obtained, it will, of course, be understood by those skilled in the art that the common conductor 15 must be provided with two parallel branches 15a and 15b, whereby only the three-phase power flows through circuit breaker 16 and only the power supplied to the single-phase load flows through circuit breaker 17.

In order to protect the three-phase load circuit including load 13 against phase faults, I provide a plurality of phase-fault relays 22, each provided with a contacting member 23 for bridging one set 24 of a plurality of parallel connected contacts connected in the circuit of trip coil 18 of circuit breaker 16. Phase-fault relays 22 are each energized from one of the current transformers associated with the circuit supplying three-phase load 13 illustrated as having secondary windings 25, 26, and 27, respectively. The rating of these current transformers should preferably be such as to accommodate the combined three-phase and single-phase loads as will become apparent from the following description. The secondary windings 25, 26, and 27 of the current transformers associated with the conductors supplying the three-phase load 13 are connected in Y relationship with the common terminal thereof connected by a residual conductor 28 with one terminal of each of the windings of phase-fault relays 22. Under normal operating conditions of the three-phase load circuit without operation of the single-phase load circuit, no current will flow in the residual current conductor 28 as will be understood by those skilled in the art.

Since conductor 15 is common to the single-phase and three-phase load circuits, the apparatus described thus far will cause a residual current to flow in conductor 28 whenever both the single-phase and three-phase loads are energized simultaneously or the single-phase load is energized alone. In order to utilize current flowing in the residual conductor 28 for operating protective apparatus when a ground fault exists on the system, it is necessary that no current should flow in conductor 28 unless a ground fault exists on the system. In other words, it is necessary to provide means for distinguishing between a normally unbalanced load and an abnormally unbalanced load on load circuits 12. Accordingly, I provide a current transformer having a secondary winding 29, which is associated with the conductor supplying the single-phase load 14 not common to both the three-phase and single-phase loads. The secondary winding 29 of this current transformer is differentially connected with the secondary winding 25 of the current transformer associated with common conductor 15 to neutralize the effect of the single-phase load current so that no current flows in residual conductor 28 under normal load conditions, that is, when there is no ground fault on the system and the single-phase load or the three-phase load are energized or both of them are simultaneously energized. The current transformers having secondary windings 25, 26, 27 and 29 should, of course, be similar, having the same ratios and ratings and, since the current transformer having secondary winding 25 must carry both its share of the single-phase and the three-phase loads, the rating of these current transformers should be the total of the combined single-phase and three-phase loads.

In order to operate circuit breaker 17 whenever a phase fault occurs on the single-phase load circuit, I have provided phase-fault relay 30 energized from a current transformer having a secondary winding 31 associated with the conductor supplying the single-phase load 14 other than common conductor 15. The ratio of this current transformer may or may not be the same as that of the current transformers having secondary windings 25, 26, 27 and 29. Phase-fault relay 30 is provided with a contacting member 32 adapted to bridge contacts 33 connected in the circuit of trip coil 20.

Whenever a ground fault occurs on the normally unbalanced load circuit 12a including the combined single-phase and polyphase loads supplied from power line 11, it is desirable that both circuit breakers 16 and 17 be opened substantially instantaneously. This can be accomplished by energizing a differential relay from the residual current flowing in residual current conductor 28 associated with the secondary windings 25, 26, 27, and 29 of the respective current transformers. However, in the event that there are several simultaneous ground faults on the plurality of normally unbalanced load circuits 12a, etc., supplied from power line 11, the residual current flowing in any one of the residual conductors 28 will be very small since generally the ground current is limited by means of a ground current-limiting impedance illustrated schematically at 34 in the drawing and connected in the ground-to-neutral circuit 35 of the polyphase source or generator 10.

Accordingly, I prefer to provide a sensitive differential relay of the wattmetric type, generally indicated at 36, having a winding 37 thereof connected in the residual current circuit in series with conductor 28. The polarizing winding 38 of wattmetric type relay 36 may be energized in any suitable manner and, if there are a plurality of normally unbalanced load circuits fed from power line 11, the polarizing coils associated with the differential relays for these circuits will be connected in series with polarizing winding 38. To indicate that additional polarizing windings are energized from the same circuit energizing the polarzing winding 38, I have shown a portion of this circuit 39 by a broken line. I have chosen to illustrate polarizing winding 38 as being energized in response to ground current flowing in conductor 35. A suitable current transformer having a secondary winding 40 is connected to supply polarizing winding 38 with current proportional to ground current flowing in circuit 35 under ground-fault conditions and, if more normally unbalanced feeder circuits are provided, then this current transformer having the secondary winding 40 will also supply the polarizing current for the necessary differential relays similar to 36 shown in the drawing.

In order to obtain operation of the ground-fault protective system at a predetermined definite value of ground current flowing in conductor 35, it may be desirable to provide an additional ground-fault relay. Accordingly, I have shown ground-fault relay 41 connected to be energized from the current transformer having the secondary winding 40 associated with ground conductor 35. This ground relay 41 is provided with contact-controlling means 42 and 43 adapted to bridge contacts 44 and 45, respectively, which are serially connected with the contacts 46 and 47 controlled by wattmetric type relay 36, so that simultaneous tripping of circuit breakers 16 and 17 will result if wattmetric relay 36 closes its contacts 46 and 47 and ground-fault relay 41 operates.

It may also be desirable to apprise the station attendant of such a ground-fault condition and, accordingly, I have illustrated ground-fault relay 41 as provided with contact-controlling means 48 arranged to control an alarm circuit including battery 49 and alarm means 50 which may be either a visible or audible signal or both.

Although I have illustrated a ground-fault relay 41 in order to obtain a definite point of operation of the apparatus, it will be understood by those skilled in the art that wattmetric type relay 36 might under certain circumstances be used alone to give the desired ground-fault protection on the normally unbalanced load circuit. Furthermore, instead of using a wattmetric type relay, any other suitable relay might be used. Preferably ground relay 41 is instantaneous in its operation while wattmetric type relay 36 operates with a slight adjustable delay.

The operation of my protective system will be obvious to those skilled in the art in view of the detailed description included above. Whenever a phase fault occurs on the normally unbalanced load circuit, phase-fault relays 22 or 30 will operate to isolate the faulty section. In view of the differential connection of the secondary windings 25, 26, 27, and 29 of the current transformers associated with the normally unbalanced load circuit, no current will flow in residual current conductor 28 unless a ground fault occurs on one of the circuits comprising normally unbalanced load circuit 12a. Such a ground fault will, of course, cause current to flow in the ground circuit 35 of source 10 and, if the magnitude of this ground current reaches a predetermined value, ground relay 41 operates. The sensitive wattmetric type relay 36 will also operate and substantially instantaneous tripping of circuit breakers 16 and 17 will result.

While I have illustrated and described a particular embodiment of my invention, it will be understood that modifications thereof will occur to those skilled in the art. I desire it to be understood, therefore, that my invention is not limited to the particular arrangements disclosed and I intend in the appended claims to cover all modifications and changes which fall within the true spirit and scope of my invention.

What I claim as new and desire to secure by Letters Patent of the United States is:

1. An alternating-current electric system comprising a plurality of interconnected circuits, one of which has fewer conductors than another of said circuits, a source of current, circuit-interrupting means, one for each of said circuits for connecting said source to each of said circuits, and a differential fault-responsive protective means for said circuits to cause operation of all of said circuit-interrupting means when a predetermined abnormal condition occurs on one of said circuits.

2. In a protective system for the interconnected combination of a pair of circuits, one of which has fewer conductors than the other, circuit-interrupting means for each of said circuits, a source of current arranged to be connected to said circuits through said circuit-interrupting means having a grounded connection through which current flows when any conductor of said circuits is grounded while said circuits are connected to said source, and a differential ground protective means for said pair of circuits to cause operation of both of said circuit-interrupting means whenever a ground fault occurs on one or both of said circuits.

3. In combination with a polyphase alternating-current system, a source of polyphase alternating current, a normally unbalanced load comprising a plurality of interconnected circuits having at least one conductor in common, one of said circuits having fewer conductors than another of said circuits, circuit-interrupting means for connecting said source and said load, and ground fault differential protective means responsive to an abnormal unbalanced condition on one of said circuits for causing operation of said circuit-interrupting means.

4. An alternating-current electric system comprising a plurality of interconnected circuits having at least one conductor in common, one of said circuits having fewer conductors than another of said circuits, a source of alternating current, a plurality of circuit-interrupting means one for each of said circuits for connecting and disconnecting said source and each of said circuits, and a differential fault-responsive protective means for said circuits to cause operation of said circuit-interrupting means when a predetermined abnormal condition occurs on one of said circuits.

5. In combination with a polyphase alternating-current source, a normally unbalanced load circuit comprising a polyphase load and an interconnected single-phase load having at least one common supply conductor, circuit-interrupting means for individually controlling the energization of said single-phase and polyphase loads from said source, and a differential fault-responsive protective means for said normally unbalanced load circuit to cause operation of said circuit-interrupting means when a predetermined abnormal condition occurs on said normally unbalanced load circuit.

6. In combination with a polyphase alternating-current source, a normally unbalanced load circuit including a three-phase load and an interconnected single-phase load, circuit-interrupting means for individually controlling the energization of said single-phase and said polyphase loads from said source, a differential fault-responsive protective means for said normally unbalanced load circuit comprising a residual current circuit in which current flows only when a ground fault exists on said normally unbalanced load circuit, and a wattmetric relay for controlling said circuit-interrupting means in response to the flow of residual current in said residual current circuit.

7. In combination with a grounded polyphase alternating-current source, a normally unbalanced load circuit including a three-phase load and an interconnected single-phase load, circuit-interrupting means for individually controlling the energization of said single-phase and said polyphase loads from said source, a fault-responsive protective means for said normally unbalanced load circuit comprising a residual current circuit in which current flows only when a ground fault exists on said normally unbalanced load circuit, and a product type relay for controlling said circuit-interrupting means having one current winding connected in said residual current circuit and a polarizing winding energized in response to current flowing in the ground circuit of said grounded polyphase alternating-current source.

8. In combination with a grounded polyphase alternating-current source, a normally unbalanced load circuit including a three-phase load and an interconnected single-phase load, circuit-interrupting means for individually controlling the energization of said single-phase and said polyphase loads from said source, a differential fault-responsive protective means for said normally unbalanced load circuit comprising a residual current circuit in which current flows only when a ground fault exists on said normally unbalanced load circuit, a product type relay for controlling said circuit-interrupting means having one current winding connected in said residual current circuit and a polarizing winding energized in response to current flowing in the ground circuit of said grounded polyphase alternating-current source, and means for rendering said product type relay ineffective to control said circuit-interrupting means unless a current of predetermined magnitude flows in the ground circuit of the grounded polyphase alternating-current source.

ARVID E. ANDERSON.